United States Patent
Ganiger et al.

(10) Patent No.: US 12,326,255 B2
(45) Date of Patent: Jun. 10, 2025

(54) DOME-DEFLECTOR FOR A COMBUSTOR OF A GAS TURBINE

(71) Applicant: General Electric Company, Schenectady, NY (US)

(72) Inventors: Ravindra Shankar Ganiger, Bengaluru (IN); Hiranya Nath, Bengaluru (IN); Deepti Bhandari, Bengaluru (IN); Girish Kamath Cannanore, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/066,427

(22) Filed: Dec. 15, 2022

(65) Prior Publication Data
US 2024/0053009 A1  Feb. 15, 2024

(30) Foreign Application Priority Data
Aug. 12, 2022  (IN) .............................. 202211046029

(51) Int. Cl.
*F23R 3/00*  (2006.01)
*F02C 7/00*  (2006.01)
*F23R 3/16*  (2006.01)

(52) U.S. Cl.
CPC ................ *F23R 3/002* (2013.01); *F02C 7/00* (2013.01); *F23R 3/16* (2013.01); *F05D 2220/32* (2013.01); *F23R 2900/03041* (2013.01); *F23R 2900/03042* (2013.01)

(58) Field of Classification Search
CPC .... F02C 7/00; F05D 2220/32; F05D 2240/35; F23R 3/002; F23R 3/16; F23R 2900/03041; F23R 2900/03042
See application file for complete search history.

(56) References Cited

U.S. PATENT DOCUMENTS

| | | | |
|---|---|---|---|
| 4,896,510 A | 1/1990 | Foltz | |
| 4,901,522 A | 2/1990 | Commaret et al. | |
| 5,129,231 A * | 7/1992 | Becker | F23R 3/14 60/754 |
| 6,212,870 B1 * | 4/2001 | Thompson | F23R 3/60 60/746 |
| 6,314,739 B1 * | 11/2001 | Howell | F23R 3/14 60/748 |
| 9,328,665 B2 | 5/2016 | Doerr et al. | |
| 10,267,523 B2 | 4/2019 | Metternich et al. | |
| 10,684,017 B2 | 6/2020 | Moura et al. | |
| 10,907,830 B2 | 2/2021 | Wilson et al. | |
| 10,927,762 B2 | 2/2021 | Harding et al. | |

(Continued)

FOREIGN PATENT DOCUMENTS

GB  2512642 A  10/2014

*Primary Examiner* — Arun Goyal
*Assistant Examiner* — Henry Ng
(74) *Attorney, Agent, or Firm* — Venable LLP; Edward A. Kmett; Michele V. Frank

(57) ABSTRACT

A combustor for a gas turbine includes a dome structure including a dome-side swirler opening therethrough, and a deflector connected to the dome structure. The deflector includes a deflector-side swirler opening therethrough and a deflector-dome connecting member arranged at the deflector-side swirler opening. The deflector-dome connecting member is connected with the dome-side swirler opening via a snap-fit type connection.

12 Claims, 11 Drawing Sheets

(56) References Cited

U.S. PATENT DOCUMENTS

| | | | | |
|---|---|---|---|---|
| 11,162,422 | B2 | 11/2021 | Baya Toda et al. | |
| 2003/0061815 | A1* | 4/2003 | Young | B23P 6/00 |
| | | | | 60/752 |
| 2009/0151359 | A1* | 6/2009 | Cayre | F23R 3/002 |
| | | | | 60/740 |
| 2013/0192233 | A1* | 8/2013 | Eastwood | F23R 3/44 |
| | | | | 60/752 |
| 2015/0040569 | A1* | 2/2015 | Sandelis | F23R 3/286 |
| | | | | 60/748 |
| 2015/0330633 | A1* | 11/2015 | Graves | F23R 3/002 |
| | | | | 60/753 |
| 2016/0201911 | A1* | 7/2016 | Chang | F23M 5/04 |
| | | | | 60/753 |
| 2016/0245520 | A1* | 8/2016 | Sadil | F23R 3/60 |
| 2016/0265780 | A1* | 9/2016 | Patel | F23R 3/34 |
| 2017/0059167 | A1* | 3/2017 | Bloom | F23R 3/007 |
| 2018/0094812 | A1* | 4/2018 | Corsmeier | F23R 3/60 |
| 2018/0202659 | A1* | 7/2018 | Stieg | F23R 3/002 |
| 2018/0274780 | A1* | 9/2018 | Kim | F23R 3/10 |
| 2019/0049113 | A1* | 2/2019 | Patel | F02C 7/18 |
| 2020/0063583 | A1* | 2/2020 | Bilse | F01D 9/023 |
| 2020/0063961 | A1* | 2/2020 | Jones | F23R 3/60 |
| 2020/0063963 | A1* | 2/2020 | Bilse | F23R 3/10 |
| 2021/0055000 | A1* | 2/2021 | Ichihashi | F01D 25/12 |
| 2021/0102701 | A1* | 4/2021 | Freeman | F23R 3/283 |
| 2021/0332979 | A1* | 10/2021 | Snyder | F23R 3/14 |
| 2021/0341150 | A1* | 11/2021 | Matsuyama | F23R 3/14 |

* cited by examiner

DOME-DEFLECTOR FOR A COMBUSTOR OF A GAS TURBINE

CROSS REFERENCE TO RELATED APPLICATIONS

The present application claims the benefit of Indian Patent Application No. 202211046029, filed on Aug. 12, 2022, which is hereby incorporated by reference herein in its entirety.

TECHNICAL FIELD

The present disclosure relates to a dome-deflector structure for a combustor of a gas turbine engine.

BACKGROUND

Gas turbine engines are known to include a combustor that has a dome structure extending around the combustor. The dome structure generally provides separation between an air plenum upstream of the dome structure, and a combustion chamber downstream of the dome structure. A plurality of mixer assemblies are included in the combustor, and each mixer assembly extends through the dome structure to provide a fuel-air mixture into a combustion chamber adjacent to the dome structure. To provide protection from heat during combustion, a separate deflector may be provided on the combustion chamber side of the dome structure to protect the mixer assembly and the dome structure from the heat generated during combustion of the fuel-air mixture in the combustion chamber.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
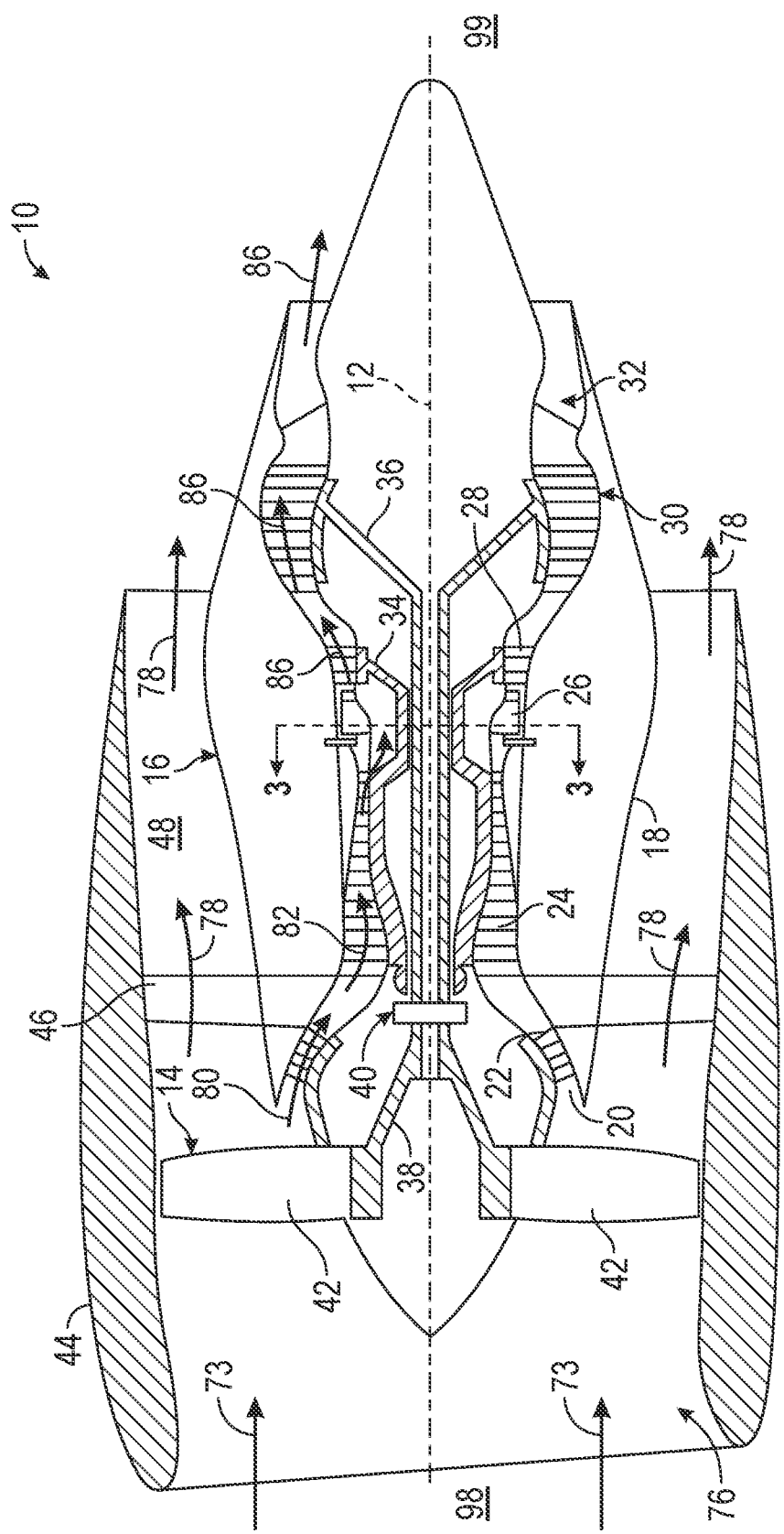
FIG. 1 is a schematic partial cross-sectional side view of an exemplary high by-pass turbofan jet engine, according to an aspect of the present disclosure.

Features, advantages, and embodiments of the present disclosure are set forth, or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" or "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Gas turbine engines are known to include a combustor having a dome structure extending around the combustor. The dome structure generally provides separation between an air plenum upstream of the dome structure, and a combustion chamber downstream of the dome structure. A plurality of mixer assemblies are generally provided in the combustor and each mixer assembly extends through the dome structure to provide a fuel-air mixture into a combustion chamber adjacent to the dome structure. A separate deflector may be provided on the dome structure to deflect heat from combustion away from the dome structure. The deflector may be connected directly to the dome structure via bolted joints. When exposed to the high heat of combustion, over time, the bolted joints and the portion of the deflector surrounding the bolted joints tend to breakdown and require replacement of the bolted joint and/or the deflector. Replacing the deflector is a costly and time-consuming process.

The present disclosure addresses the foregoing by providing a dome-deflector structure having a more compliant connection of the deflector with the dome structure. According to the present disclosure, in connecting the deflector to the dome structure, the deflector may include a deflector-dome connecting member (e.g., a flange) around a swirler opening through the deflector that connects to a swirler opening through the dome with a snap-fit type connection. A radially outer portion and a radially inner portion of the deflector may be connected within the combustor in one of several aspects. In one aspect, the radially outer portion and the radially inner portion of the deflector may be connected to the dome structure itself via a snap-fit type connection. In another aspect, the radially outer portion and the radially inner portion of the deflector may be connected to a connection between the outer liner or the inner liner, the dome structure, and a cowl. In yet another aspect, the radially outer portion and the radially inner portion of the deflector may be connected with the outer liner and with the inner liner. In each aspect, the deflector is connected with a compliant snap-fit joint at the swirler opening, and can be connected within the combustor without the need to be bolted directly to the dome structure. Since the direct bolted joint is not present, a breakdown of the bolted joint and/or a breakdown of the deflector about the bolted joint can be eliminated, thereby increasing the reliability of the deflector and reducing the need for replacement of the deflector. In addition, the snap-fit type connection of the deflector to the dome structure provides for better radial and axial flexibility of the dome-deflector structure to better accommodate thermal expansion of the dome and/or the deflector caused by combustion.

Referring now to the drawings, FIG. 1 is a schematic partial cross-sectional side view of an exemplary high by-pass turbofan jet engine 10, herein referred to as "engine 10," as may incorporate various embodiments of the present disclosure. Although further described below with reference to a ducted turbofan engine, the present disclosure is also applicable to turbomachinery in general, including turbojet, turboprop, and turboshaft gas turbine engines, including marine and industrial turbine engines and auxiliary power units. In addition, the present disclosure is not limited to ducted fan type turbine engines, such as that shown in FIG. 1, and can be implemented in unducted fan (UDF) type turbine engines that include combustors having a dome-deflector structure. As shown in FIG. 1, engine 10 has an axial centerline axis 12 that extends therethrough from an upstream end 98 to a downstream end 99 for reference purposes. In general, engine 10 may include a fan assembly 14 and a core engine 16 disposed downstream from the fan assembly 14.

The core engine 16 may generally include an outer casing 18 that defines an annular inlet 20. The outer casing 18 encases, or at least partially forms, in serial flow relationship, a compressor section (22/24) having a low pressure (LP) compressor 22, a high pressure (HP) compressor 24, a combustor 26, a turbine section (28/30) including a high pressure (HP) turbine 28 and a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40, such as in an indirect-drive or a geared-drive configuration.

As shown in FIG. 1, the fan assembly 14 includes a plurality of fan blades 42 that are coupled to, and extend radially outwardly from, the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially spaced outlet guide vanes or struts 46. Moreover, at least a portion of the nacelle 44 may extend over an outer portion of the core engine 16 so as to define a bypass airflow passage 48 therebetween.

Figure 2:
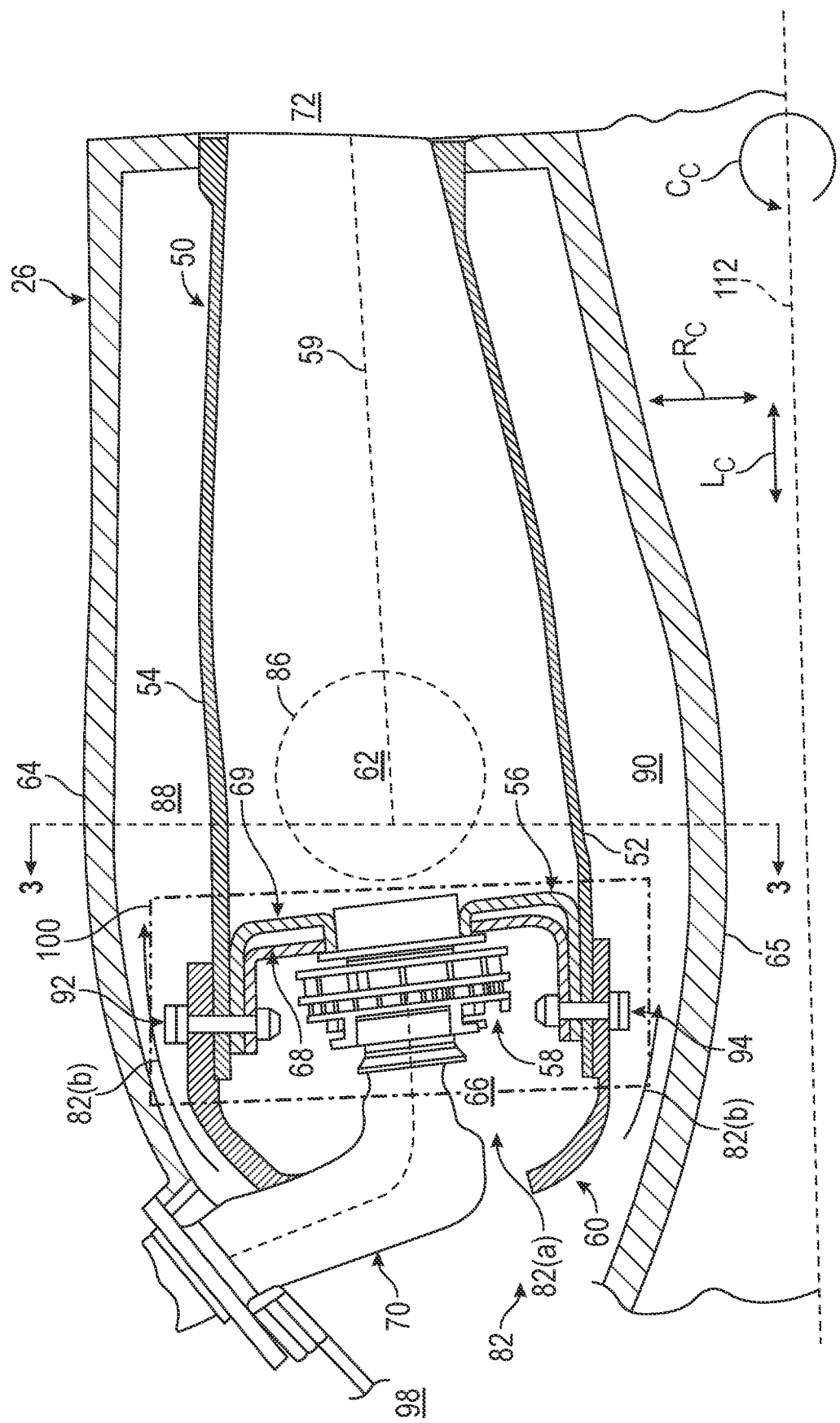
FIG. 2 is a partial cross-sectional side view of an exemplary combustor, according to an aspect of the present disclosure.

FIG. 2 is a cross-sectional side view of an exemplary combustor 26 of the core engine 16 as shown in FIG. 1. FIG. 2 depicts a combustor axial centerline 112 that may generally correspond to the engine axial centerline axis 12. Thus, the combustor 26 of FIG. 2 defines a combustor longitudinal direction ($L_C$) corresponding to the combustor axial centerline 112, a combustor radial direction ($R_C$) extending outward from the combustor axial centerline 112, and a combustor circumferential direction ($C_C$) extending circumferentially about the combustor axial centerline 112. As shown in FIG. 2, the combustor 26 may generally include a combustor liner 50, having an inner liner 52 and an outer liner 54, that are connected to a cowl 60. Each of the inner liner 52 and the outer liner 54 may be annular liners that extend circumferentially about the combustor axial centerline 112. A dome-deflector structure 56 (to be described in more detail below) may include a dome structure 68 and a deflector 69 connected with the dome structure 68. The dome-deflector structure 56 may be connected with the cowl 60 and the outer liner 54 via an outer connection 92 (e.g., via a bolted connection), and may be connected with the cowl 60 and the inner liner 52 via an inner connection 94 (e.g., via a bolted connection). The dome-deflector structure 56 extends in the combustor radial direction $R_C$ between the inner liner 52 and the outer liner 54, and also extends in the circumferential direction $C_C$. A swirler assembly 58 engages with the dome-deflector structure 56 and extends through the dome-deflector structure 56 along a swirler centerline axis 59. The swirler assembly 58 may be connected with a fuel nozzle assembly 70 that provides a flow of fuel to the swirler assembly 58. Together, the inner liner 52, the outer liner 54, and the dome-deflector structure 56 define a combustion chamber 62. In the combustion chamber 62, an initial chemical reaction of an ignited fuel-oxidizer mixture injected into the combustion chamber 62 by the swirler assembly 58 may occur to generate combustion gases 86. The combustion gases 86 then flow further downstream into the HP turbine 28 and the LP turbine 30 (FIG. 1) via a turbine nozzle 72 at a downstream end of the combustion chamber 62. While FIG. 2 depicts a single swirler assembly 58, a plurality of the swirler assemblies 58 are present in the combustor 26, where the respective swirler assemblies 58 are circumferentially spaced apart from one another about the combustor axial centerline 112, and each respective swirler assembly 58 extends through the dome-deflector structure 56.

The combustor 26 further includes an outer casing 64 that extends circumferentially about the combustor axial centerline 112, and an inner casing 65 that also extends circumferentially about the combustor axial centerline 112. An outer flow passage 88 is defined between the outer casing 64 and the outer liner 54, and an inner flow passage 90 is defined between the inner casing 65 and the inner liner 52.

Referring back to FIG. 1, in operation, air 73 enters the nacelle 44 at a nacelle inlet 76, and a portion of the air 73 enters the compressor section (22/24) as a compressor inlet air flow 80, where it is compressed to form compressed air 82. Another portion of the air 73 enters the bypass airflow passage 48, thereby providing a bypass airflow 78. In FIG. 2, the compressed air 82 from the compressor section (22/24) enters the combustor 26 via a diffuser (not shown). A portion of the compressed air 82 (shown schematically as compressed air 82(a)) enters the cowl 60 into a pressure plenum 66 therewithin, while another portion of the compressed air 82 (shown schematically as compressed air 82(b)) passes to the outer flow passage 88 and to the inner flow passage 90. The compressed air 82(a) in the pressure plenum 66 passes through the swirler assembly 58 to mix with fuel injected by the fuel nozzle assembly 70 to form the fuel-oxidizer mixture that is then ignited and burned in the combustion chamber 62 to generate the combustion gases 86. The portion of the compressed air 82(b) in the outer flow passage 88 and in the inner flow passage 90 may be used for other purposes, such as for dilution of the combustion gases 86 or for cooling of various components of the engine 10.

Figure 3:
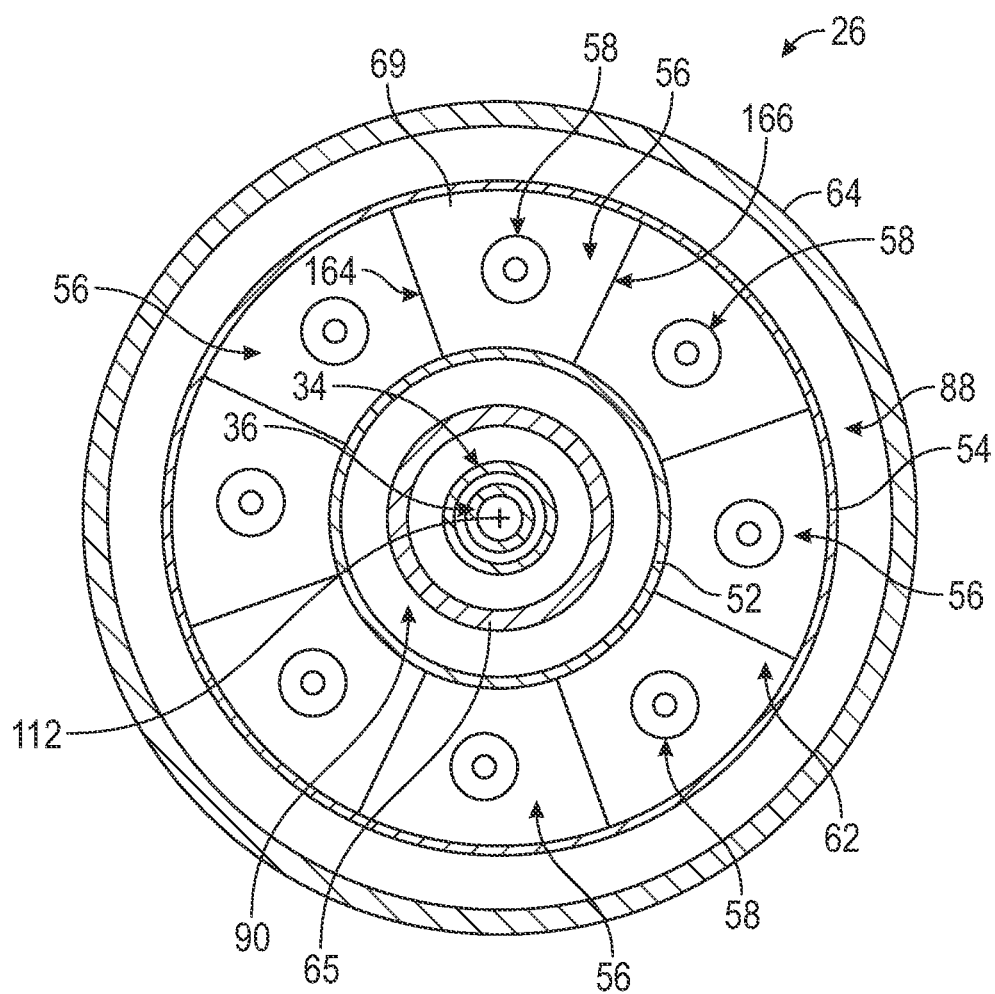
FIG. 3 is an aft forward-looking cross-sectional view of a combustor, taken at plane 3-3 (FIG. 1 and FIG. 2), according to an aspect of the present disclosure.

FIG. 3 depicts an aft forward-looking cross-sectional view through the combustor 26, taken at plane 3-3 of FIGS. 1 and 2, according to an aspect of the present disclosure. As shown in FIG. 3, the outer casing 64, the outer flow passage 88, the outer liner 54, the combustion chamber 62, the inner liner 52, the inner flow passage 90, and the inner casing 65 extend circumferentially about the combustor axial centerline 112. In addition, the dome-deflector structure 56 extends circumferentially about the combustor axial centerline 112. The dome-deflector structure 56 may include a plurality of dome-deflector structures 56 connected together circumferentially, where each dome-deflector structure 56 may include the dome structure 68 and the deflector 69 (FIG. 2). Alternatively, the dome structure 68 of the dome-deflector structure 56 may extend circumferentially about the combustor axial centerline 112 as a single dome structure 68, while a plurality of deflectors 69 may be connected with the single dome structure 68.

Figure 4:
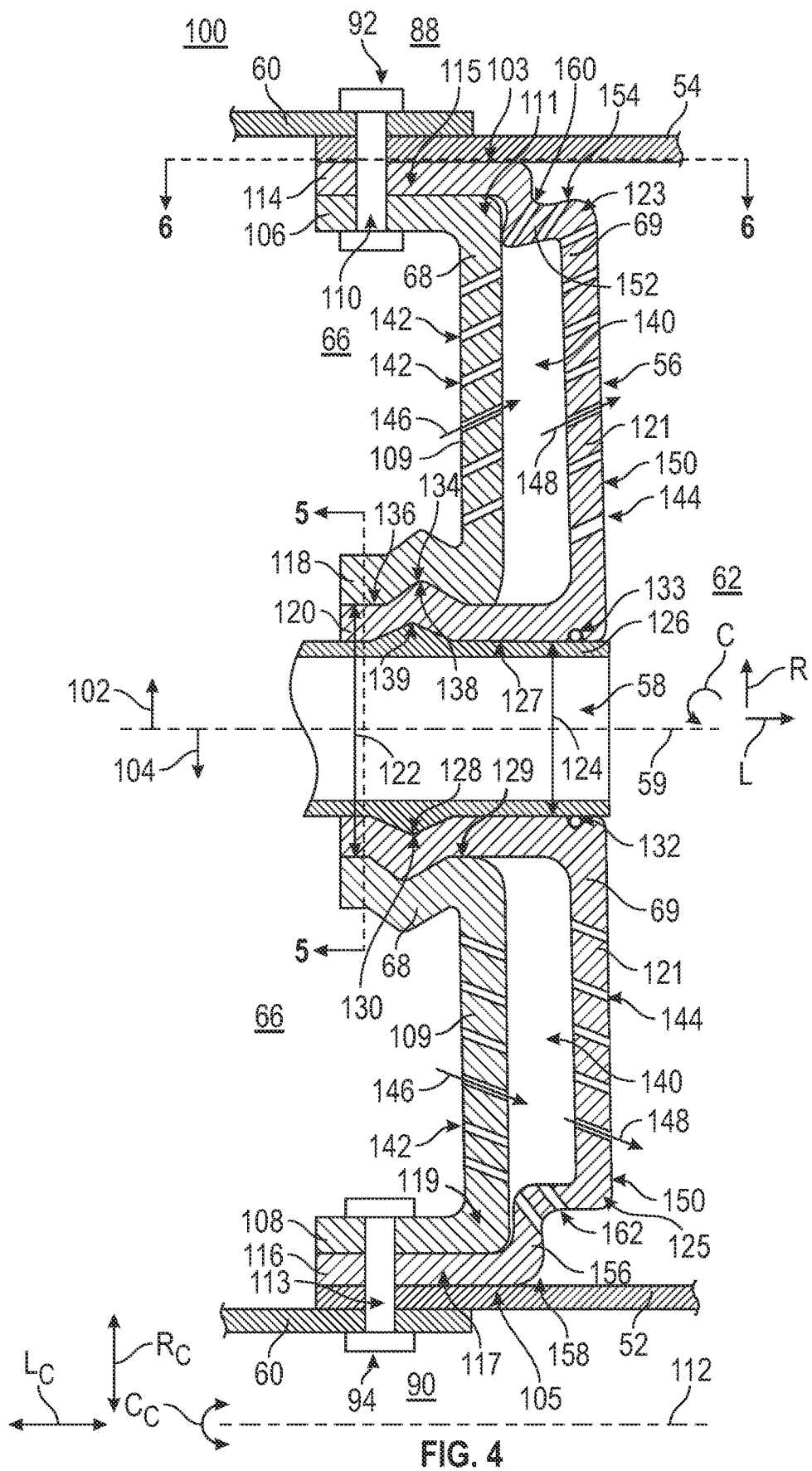
FIG. 4 is an enlarged cross-sectional view of a dome-deflector structure taken at detail view 100 of FIG. 2, according to an aspect of the present disclosure.

FIG. 4 is an enlarged cross-sectional view of a dome-deflector structure taken at detail view 100 of FIG. 2, according to an aspect of the present disclosure. As shown in FIG. 4, the dome-deflector structure 56 includes the dome structure 68 and the deflector 69, each of which extends in the combustor radial direction $R_C$ between the inner liner 52 and the outer liner 54. For reference purposes, the swirler centerline axis 59 may define a longitudinal direction (L) extending along the swirler centerline axis 59, a radial direction (R) extending outward from the swirler centerline axis 59, and a circumferential direction (C) extending about the swirler centerline axis 59. The swirler centerline axis 59 may or may not extend parallel with the combustor axial centerline 112. In relation to the swirler centerline axis 59, the dome-deflector structure 56 extends on an outer side 102 of the swirler centerline axis 59, and extends on an inner side 104 of the swirler centerline axis 59. The outer side 102 is thus made with reference to the outer liner 54, and the inner side 104 is made with reference to the inner liner 52. As was discussed above, the dome-deflector structure 56 is connected with the cowl 60 and the outer liner 54 via the outer connection 92, and is connected with the cowl 60 and the inner liner 52 via the inner connection 94. The dome structure 68 includes a dome wall 109 that generally extends in the radial direction R, and a dome outer flange 106 arranged at an outer side 111 of the dome wall 109 and that extends upstream in the longitudinal direction L from the dome wall 109 and extends in the circumferential direction C. The dome outer flange 106 is connected with the outer connection 92 via, for example, a bolted connection 110. The dome structure 68 also includes a dome inner flange 108 that is arranged at an inner side 119 of the dome wall 109 and that extends upstream in the longitudinal direction L from the dome wall 109 and extends in the circumferential direction C. The dome inner flange 108 is connected with the inner connection 94 via, for example, a bolted connection 113. Similarly, the deflector 69 includes a deflector wall 121 that generally extends in the radial direction R, and an outer connecting member 114 arranged on an outer side 123 of the deflector wall 121 for connecting an outer side 103 of the deflector 69, which may also be an outer flange 115 extending in the longitudinal direction L and in the circumferential direction C, with the cowl 60 and the outer liner 54 via the outer connection 92, which may be the bolted connection 110. Similarly, the deflector 69 includes an inner connecting member 116 arranged on an inner side 125 of the deflector wall 121 for connecting an inner side 105 of the deflector 69, which may also be an inner flange 117 extending in the longitudinal direction L and in the circumferential direction C, with the cowl 60 and with the inner liner 52 via the inner connection 94, such as the bolted connection 113.

Figure 5:
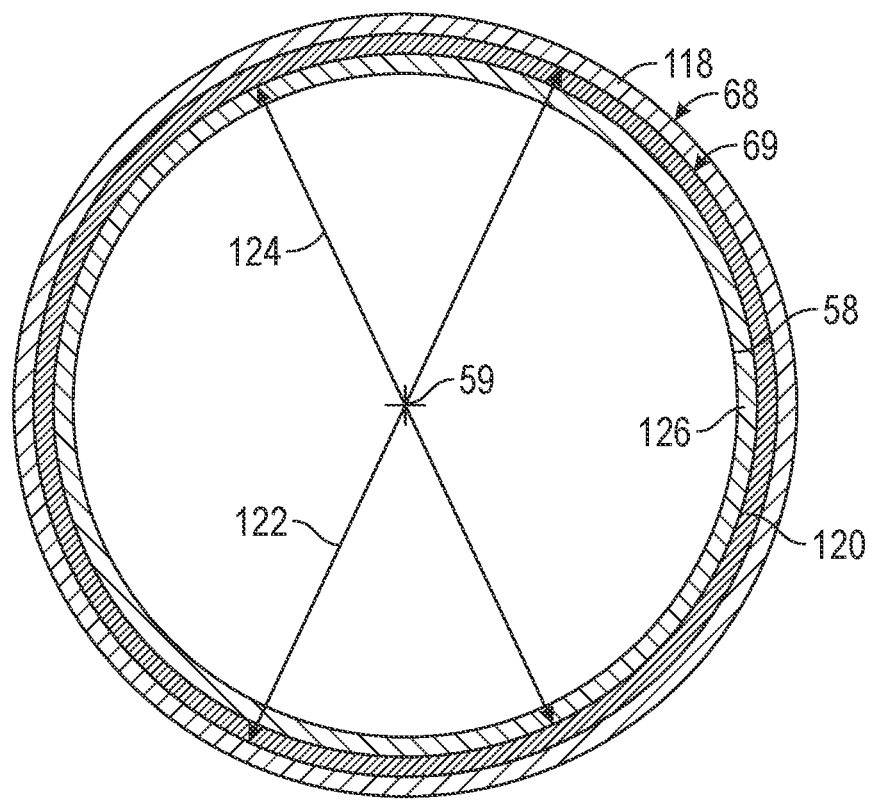
FIG. 5 is a cross-sectional view of a dome-deflector-swirler connection taken at plane 5-5 of FIG. 4, according to an aspect of the present disclosure.

The dome structure 68 and the deflector 69 are also connected at the swirler assembly 58. In forming this connection, the dome structure 68 includes a deflector connecting flange 118, and the deflector 69 includes a deflector-dome connecting member 120. Referring to FIG. 5, which is a cross-sectional view taken at plane 5-5 of FIG. 4, both the deflector connecting flange 118 and the deflector-dome connecting member 120 are generally tubular walls that extend circumferentially about the swirler centerline axis 59. The dome structure 68 includes a dome-side swirler opening 122 through the deflector connecting flange 118, and the deflector 69 includes a deflector-side swirler opening 124 through the deflector-dome connecting member 120. The swirler centerline axis 59 also defines a centerline of the dome-side swirler opening 122 and a centerline of the deflector-side swirler opening 124.

Referring back to FIG. 4, the deflector-side swirler opening 124 of the deflector-dome connecting member 120 engages with an outer surface 131 of a swirler outlet housing 126. The deflector-dome connecting member 120 extends upstream in the longitudinal direction L from the deflector wall 121 and has an inner surface 127 that engages with the outer surface 131 of the swirler outlet housing 126, and an outer surface 136. The deflector-dome connecting member 120 includes a V-shaped deflector notch 128 formed in the connecting member 120 at the deflector-side swirler opening 124 with an apex of the V-shaped deflector notch extending radially outward in the radial direction R from the inner surface 127 and that extends circumferentially about the deflector-side swirler opening 124. The swirler outlet housing 126 includes a V-shaped crest 130 with an apex of the V-shaped crest 130 extending radially outward in the radial direction R from the outer surface 131 of the swirler outlet housing 126 and that extends circumferentially about the swirler outlet housing 126. In connecting the deflector 69 and the swirler outer housing 126 together, the deflector-dome connecting member 120 is installed over the swirler outlet housing 126 so that the V-shaped deflector notch 128 engages with the V-shaped crest 130 on the swirler outlet housing 126 in a snap-fit type configuration. A piston seal 132 may also be provided circumferentially between the deflector 69 and the swirler outlet housing 126, and may be included within a groove 133 provided in the deflector 69. Alternatively, a groove (not shown) may be provided in the swirler outlet housing 126 so that the piston seal 132 may be included in the groove in the swirler outlet housing 126 instead.

The deflector-dome connecting member 120 also includes a V-shaped crest 134 with an apex of the V-shaped crest 134 extending radially outward in the radial direction R from the outer surface 136 of the deflector-dome connecting member 120. The deflector connecting flange 118 includes a V-shaped dome notch 138 with an apex of the V-shaped dome notch 138 extending radially outward in the radial direction R from an inner surface 129 of the deflector connecting flange 118 at the dome-side swirler opening 122. In connecting the dome 68 and deflector 69 together, the dome connecting flange 118 is installed over the dome-deflector connecting flange 120 so that dome-side swirler opening 122 engages with the outer surface 136 of the deflector-dome connecting member 120, and the V-shaped crest 134 engages with the V-shaped dome notch 138 so as to form a snap-fit type connection 139 between the dome structure 68 and the deflector 69.

The dome structure 68 and the deflector 69 may be constructed of various material types, including metal materials (e.g., sheet metal) and ceramic matrix composite (CMC) materials. To account for potential variations in thermal expansion of the dome structure 68 and the deflector 69, the dome structure 68 and the deflector 69 may be constructed of materials having a similar thermal coefficient of expansion. For example, both the dome structure 68 and the deflector 69 may be constructed of a metal material having a same or a substantially the same thermal coefficient of expansion. Alternatively, since the deflector 69 is directly exposed to the hot combustion gases within the combustion chamber 62 (FIG. 2), and the dome structure 69 is more generally exposed to the colder air from the pressure plenum 66 (FIG. 2), the dome structure 68 and the deflector 69 may be constructed of different materials that limit the amount of relative thermal expansion between the dome structure 68 and the deflector 69 at the snap-fit connection 139 in order to maintain the connection. In this case, for example, the dome structure 68 may be constructed of sheet metal material, and due to the exposure of the dome structure 68 primarily to the cooler air from the pressure plenum 66, the sheet metal dome structure 68 may have relatively little thermal expansion. At the same time, the deflector 69 may be constructed of CMC material, and even though the CMC deflector 69 is exposed to the much higher temperatures of the combustion gases, the CMC deflector 69 may have relatively little thermal expansion. As a result, the snap-fit connection 139 can be maintained between the dome structure 68 and the deflector 69.

The dome-deflector structure 56 includes a cavity 140 between the dome structure 68 and the deflector 69. The dome structure 68 may include a plurality of dome-side cooling passages 142 through the dome structure 68 to allow a flow 146 of the cooling air (i.e., compressed air 82(a)) of FIG. 2) from the pressure plenum 66 to flow into the cavity 140. The deflector 69 may include a plurality of deflector-side cooling passages 144 through the deflector 69 to allow a flow 148 of cooling air (i.e., the compressed air 82(a)) to flow from the cavity 140 through the deflector 69 to provide surface cooling to a combustion chamber side 150 of the deflector 69.

The deflector 69 may also include a flexure portion 152 at a radially outer side 154 of the deflector 69, and may also include a flexure portion 156 at a radially inner side 158 of the deflector 69. The flexure portion 152 and the flexure portion 156 provide for radial flexibility of the deflector 69. The flexure portion 152 may include cooling passages 160 therethrough, and the flexure portion 156 may include cooling passages 162 therethrough. Alternatively, the cooling passages 160 and the cooling passages 162 may be omitted from the flexure portion 152 and from the flexure portion 156.

Figure 6:
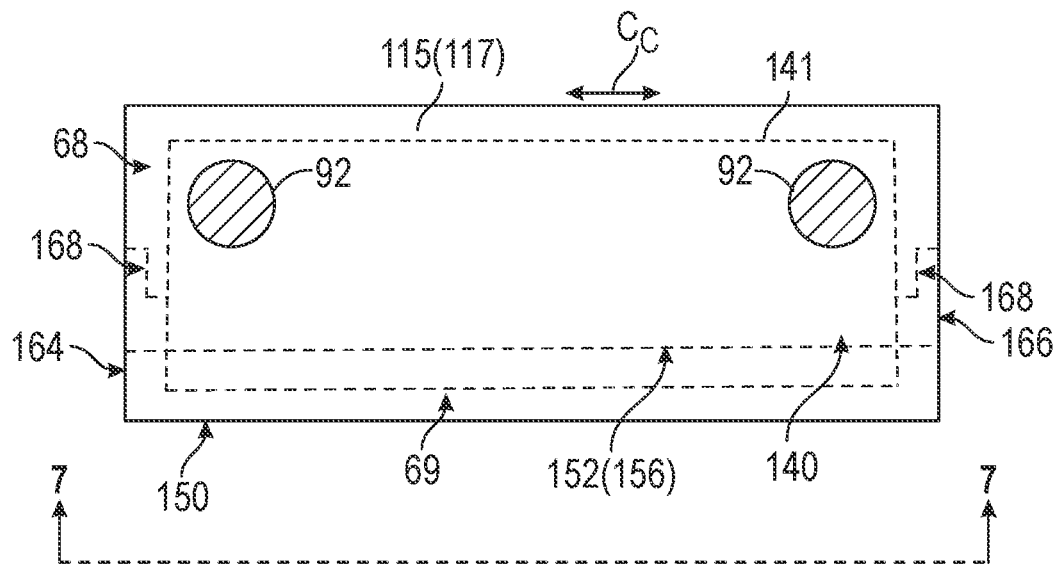
FIG. 6 is a cross-sectional view of a radially outer side of the dome-deflector structure, taken at plane 6-6 of FIG. 4, according to an aspect of the present disclosure.

FIG. 6 is a view of a radially outer side of the dome-deflector structure 56, taken at plane 6-6 of FIG. 4, according to an aspect of the present disclosure. As shown in FIG. 6, the deflector 69 extends in the combustor circumferential direction $C_C$ between a first side 164 (see also FIG. 3) and a second side 166 (see also FIG. 3). The outer flange 115 and the flexure portion 152 may not include any airflow openings, including the cooling passages 160, so as to define a generally sealed dome-deflector structure 56. A similar solid (i.e., omitting any airflow openings including cooling passages 162) inner flange 117 and flexure portion 156 may be provided on the inner side 104 of the dome-deflector structure 56. The first side 164 and the second side 166 may define a generally sealed joint between the dome structure 68 and the deflector 69 by including, for example, a spline joint connection 168 (shown with dashed lines). Thus, the arrangement of FIG. 6 may provide for a generally sealed dome-deflector structure 56 about a perimeter 141 of the cavity 140 so as to provide a desired amount of the flow 146 into the cavity 140 and a desired amount of the flow 148 exiting the cavity 140 to provide the surface cooling of the combustion chamber side 150 of the deflector 69.

Figure 7A:
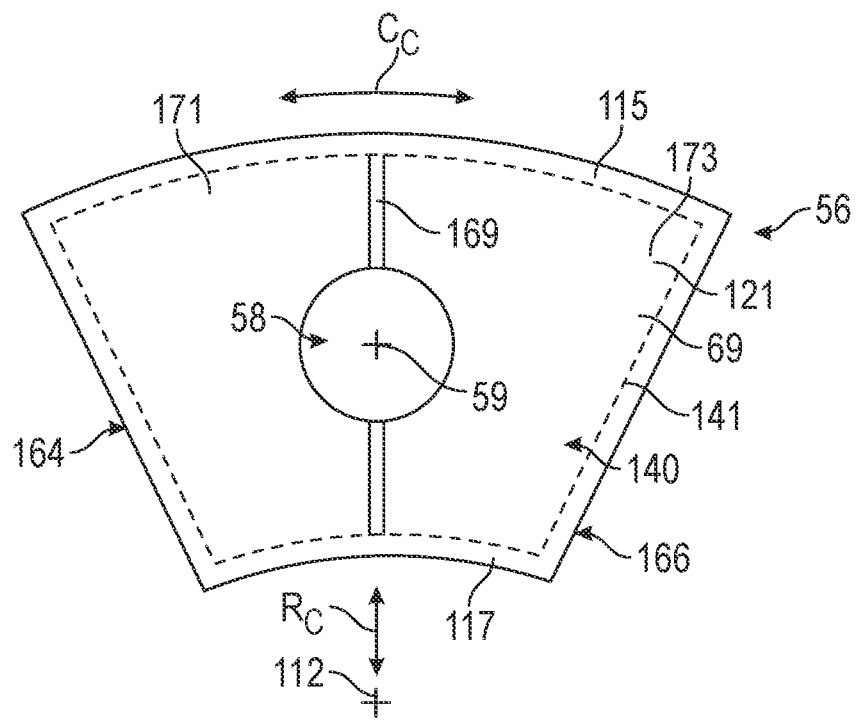
FIG. 7A is a forward looking elevational view of a deflector taken at plane 7-7 of FIG. 6, according to an aspect of the present disclosure.
Figure 7B:
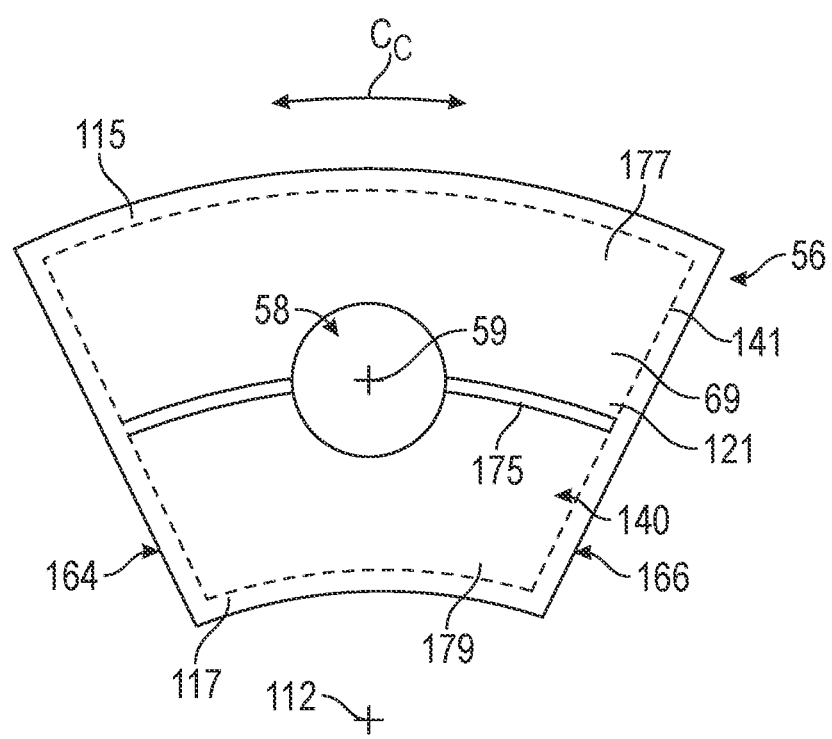
FIG. 7B is an alternate forward looking elevational view to that of FIG. 7A, according to another aspect of the present disclosure.

FIG. 7A is a forward looking elevational view of a deflector taken at plane 7-7 of FIG. 6, according to an aspect of the present disclosure. In the FIG. 7A aspect, the generally sealed dome-deflector structure 56 of FIG. 6 may instead include a radially extending split 169 dividing the deflector 69 into circumferentially arranged sections, including a first circumferential section 171 and a second circumferential section 173. FIG. 7B is an alternate view to that of FIG. 7A according to an alternate aspect of the present disclosure. Alternatively, as shown in FIG. 7B, the generally sealed dome-deflector structure 56 may include a circumferentially extending split 175 dividing the deflector 69 into radially arranged sections, including a first radial section 177 and a second radial section 179. Thus, the radially extending split 169 allows for circumferential expansion of the deflector 69 and the circumferentially extending split 175 allows for radial expansion of the deflector 69.

Figure 8A:
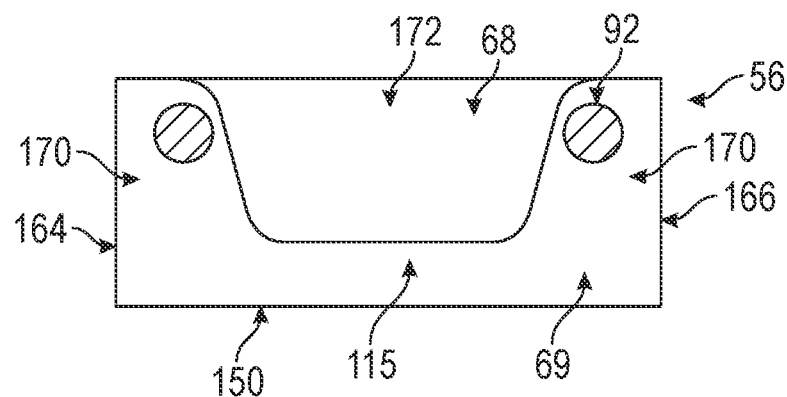
FIGS. 8A and 8B are alternative arrangements to that shown in FIG. 6 of the radially outer side of the dome-deflector structure, according to additional aspects of the present disclosure.
Figure 8B:
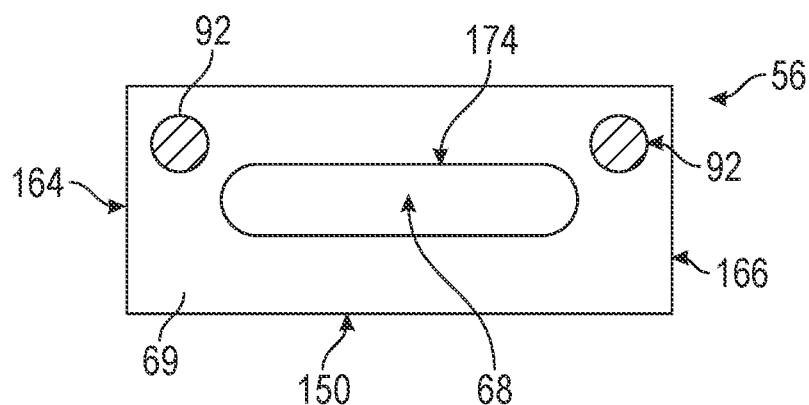

FIGS. 8A and 8B are alternative arrangements to that shown in FIG. 6 of the radially outer side of a dome-deflector structure 56, according to additional aspects of the present disclosure. In FIGS. 8A and 8B, like reference numerals are included for common elements that were described above with regard to the FIG. 6 aspect. Each of the aspects shown in FIGS. 8A and 8B provides for a generally sealed dome-deflector structure 56 in a similar manner to the FIG. 6 aspect. In FIG. 8A, the outer flange 115 of the deflector 69 may include multiple flanges 170, with a cutout portion 172 in between each of the flanges 170. Each of the multiple flanges 170 may be connected to respective ones of the outer connections 92. The cutout portion 172 may provide for some stress relief to the deflector 69 from the heat of combustion. FIG. 8B is similar to the FIG. 6 aspect, but includes a slotted cutout 174 in the outer flange 115, which may also provide for stress relief of the deflector 69.

Figure 9:
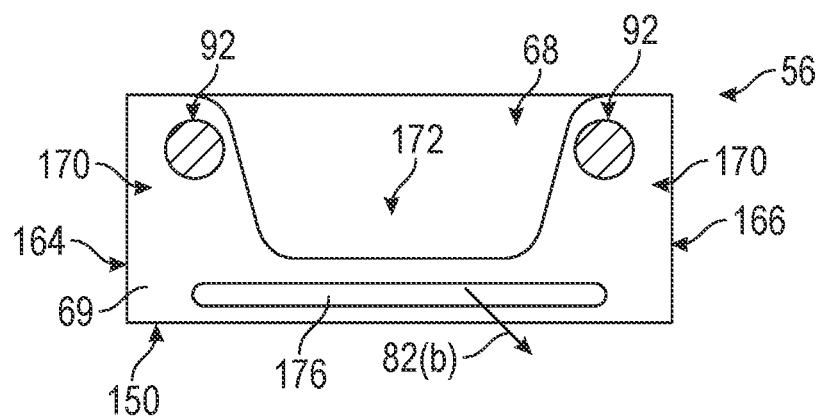
FIG. 9 is another alternative arrangement of the radially outer side of the dome-deflector structure similar to that shown in FIG. 8A, but for an unsealed dome-deflector structure according to an aspect of the present disclosure.

FIG. 9 is another alternative arrangement of the radially outer side of the dome-deflector structure similar to that of FIG. 8A, but for an unsealed dome-deflector structure 56. In the FIG. 9 aspect, the deflector 69 includes a slotted airflow opening 176, which may be provided in the deflector 69 instead of the cooling passages 160 (FIG. 4). With the FIG. 9 aspect, the deflector 69 may omit the deflector-side cooling passages 144 and instead, may provide for a flow of the compressed air 82(b) from the cavity 140 to flow through the slotted airflow opening 176 into the combustion chamber 62.

Figure 10:
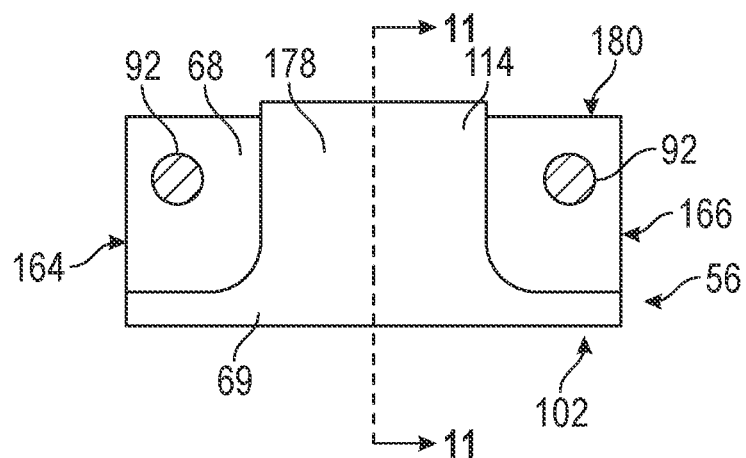
FIG. 10 depicts an alternative arrangement to that shown in FIG. 6 of the outer side of the dome-deflector structure, according to another aspect of the present disclosure.
Figure 11:
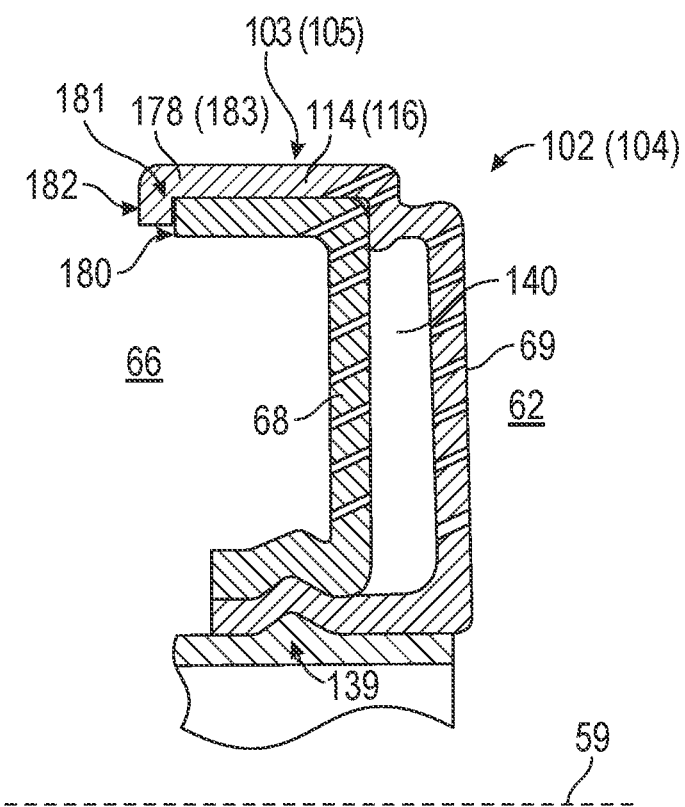
FIG. 11 is a partial cross-sectional view of a dome-deflector structure taken at plane 11-11 of FIG. 10, according to an aspect of the present disclosure.

FIG. 10 depicts an alternative arrangement to that shown in FIG. 6 of the outer side 102 of the dome-deflector structure 56, according to another aspect of the present disclosure. FIG. 11 is a partial cross-sectional view taken at plane 11-11 of FIG. 10. In FIGS. 10 and 11, the deflector 69 includes the outer connecting member 114 and the inner connecting member 116 as being a snap-fit type connection with the dome structure 68 rather than having a bolted connection (110, 113 (FIG. 4) with the dome structure 68 as was shown in FIG. 6 to FIG. 8B. The outer connecting member 114 of FIGS. 10 and 11 includes an outer flange 178 extending beyond a forward end 180 of the dome structure 68, and includes a dome engagement portion 182 that engages with the forward end 180 of the dome structure 68 with a snap-fit type connection 181. While FIGS. 10 and 11 depict the outer side 102 of the dome-deflector structure 56, a similar arrangement for the deflector 69 to engage the dome structure 68 with a snap-fit type connection 181 on the inner side 104 may also be included. Specifically, an inner flange 183 may engage the dome structure 68 via the snap-fit type connection 181. Thus, the aspect of FIGS. 10 and 11 may provide for a deflector 69 that is attached to the dome structure 68 entirely with a snap-fit type connection, including the snap-fit type connection 139 and the snap-fit type connection 181, without the need for a bolted connection.

Figure 12:
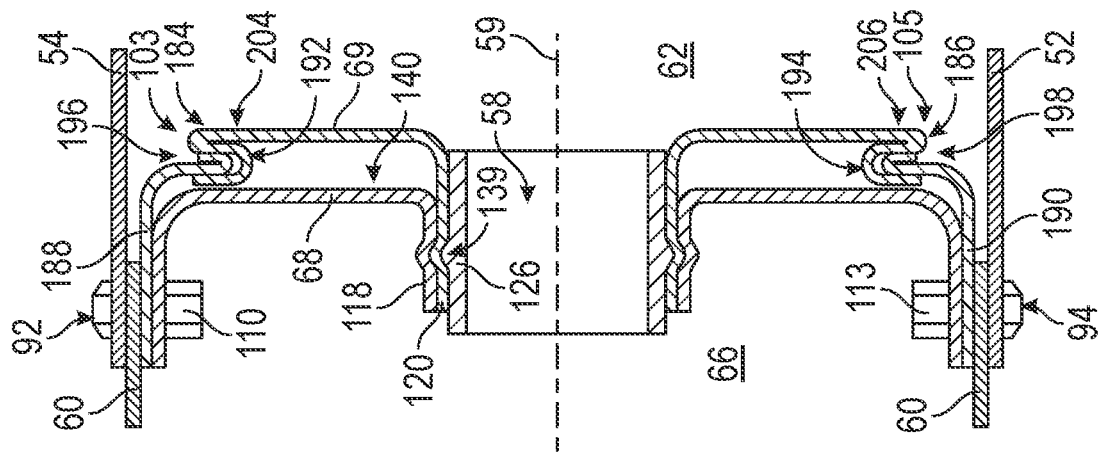
FIG. 12 is a partial cross-sectional side view of an alternate exemplary dome-deflector structure to that shown in FIG. 4, according to another aspect of the present disclosure.

FIG. 12 is a partial cross-sectional side view of an alternate exemplary dome-deflector structure from that shown in FIG. 4, according to another aspect of the present disclosure. In FIG. 12, the dome structure 68 and the deflector 69 are connected at the swirler assembly 58 with the snap-fit type connection 139 in the same manner as the above aspects described with regard to FIGS. 4 to 11. In the FIG. 12 aspect, however, the deflector 69 includes an outer connecting member 184 that includes a hook-type connector 192, and the deflector 69 also includes an inner connecting member 186 that is a hook-type connector 194. The FIG. 12 aspect also includes an outer deflector connecting member 188 that is connected with the outer connection 92 by, for example, being connected with the bolted connection 110. An inner deflector connecting member 190 is connected with the inner connection 94 by, for example, being connected with the bolted connection 113. The outer deflector connecting member 188 includes a hook-type connector 196 that engages with the hook-type connector 192 of the outer connecting member 184, and the inner deflector connecting member 190 includes a hook-type connector 198 that engages with the hook-type connector 198 of the inner connecting member 186. Thus, the outer connecting member 184 and the outer deflector connecting member 188 are connected via a hook-type connection 200, and the inner connecting member 186 and the inner deflector connecting member 190 are connected via a hook-type connection 202. In the FIG. 12 aspect, the hook-type connector 192 of the outer connecting member 184 is shown as being engaged within the hook-type connector 196 of the outer deflector connecting member 188. Similarly, the hook-type connector 194 of the inner connecting member 186 is shown as being engaged within the hook-type connector 198 of the inner deflector connecting member 190.

Figure 13:
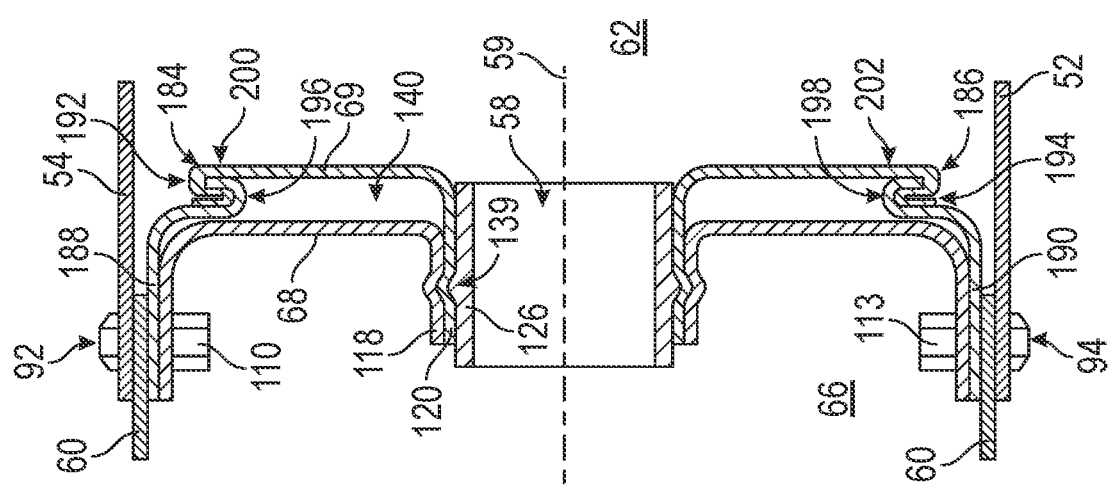
FIG. 13 is a partial cross-sectional side view of another alternate exemplary dome-deflector structure to that shown in FIG. 4, according to another aspect of the present disclosure.

FIG. 13 is a partial cross-sectional side view of an exemplary dome-deflector structure according to another aspect of the present disclosure. The FIG. 13 aspect is similar to the FIG. 12 aspect and like reference numerals are provided therein. One difference between the FIG. 13 aspect and the FIG. 12 aspect is that the hook-type connector 196 of the outer deflector connecting member 188 is engaged within the hook-type connector 192 of the outer connecting member 184. Thus, with the hook-type connector 196 engaging within the hook-type connector 192, a snap-fit type connection 204 is provided at the outer connecting member 184. Similarly, the hook-type connector 198 of the inner deflector connecting member 190 is engaged within the hook-type connector 194 of the inner connecting member 186. Thus, with the hook-type connector 198 engaging within the hook-type connector 194, a snap-fit type connection 206 is provided at the inner connecting member 186.

Figure 14:
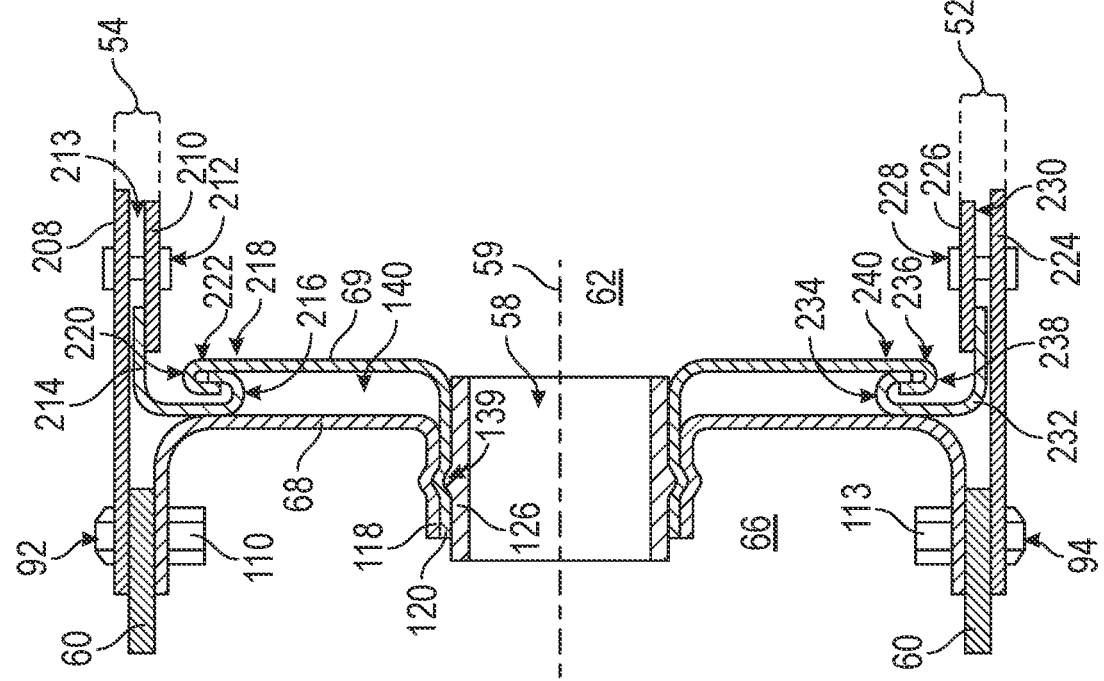
FIG. 14 is a partial cross-sectional side view of still another alternate exemplary dome-deflector structure to that shown in FIG. 4, according to yet another aspect of the present disclosure.

FIG. 14 is a partial cross-sectional side view of another alternate exemplary dome-deflector structure to that shown in FIG. 4, according to another aspect of the present disclosure. In the FIG. 14 aspect, the outer liner 54 is a multi-layer liner that includes an outer liner shell 208 and an outer liner heat shield panel 210 that are connected together via an outer liner connector 212 (such as a bolted connection) with a baffle cavity 213 therebetween. The outer liner 54 also includes an outer deflector connecting member 214 that may be bonded (e.g., brazed) to the outer liner shell 208 or may be bonded to the outer liner heat shield panel 210. The outer deflector connecting member 214 includes a hook-type connector 216 for connecting the deflector 69. The deflector 69 includes an outer connecting member 218 that includes a hook-type connector 220. The hook-type connector 220 of the outer connecting member 218 and the hook-type connector 216 of the outer deflector connecting member 214 are connected via a hook-type connection 222.

Similar to the outer liner 54, the inner liner 52 is a multi-layer liner that includes an inner liner shell 224 and an inner liner heat shield panel 226 that are connected together via an inner liner connector 228 (such as a bolted connection) with a baffle cavity 230 therebetween. The inner liner 52 also includes an inner deflector connecting member 232 that may be bonded (e.g., brazed) to the inner liner shell 224 or may be bonded to the inner liner heat shield panel 226. The inner deflector connecting member 232 includes a hook-type connector 234 for connecting the deflector 69. The deflector 69 includes an inner connecting member 236 that includes a hook-type connector 238. The hook-type connector 238 of the inner connecting member 236 and the hook-type connector 234 of the inner deflector connecting member 232 are connected via a hook-type connection 240.

Figure 15:
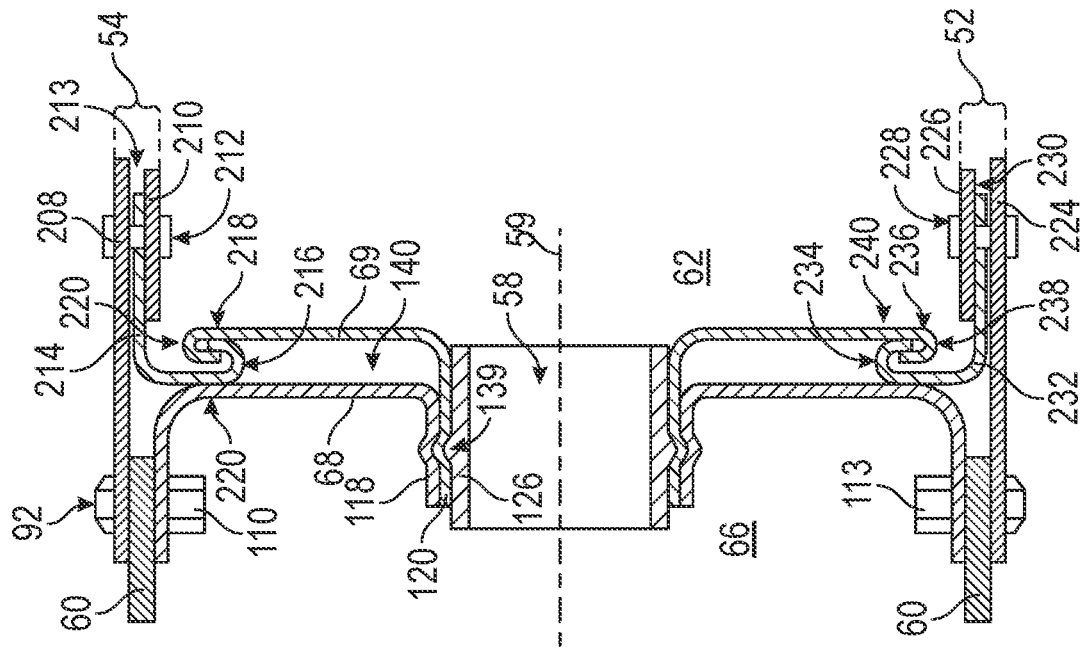
FIG. 15 is a partial cross-sectional side view of another alternate exemplary dome-deflector structure to that shown in FIG. 4, according to another aspect of the present disclosure.

FIG. 15 is a partial cross-sectional side view of still another alternate exemplary dome-deflector structure to that shown in FIG. 4, according to still another aspect of the present disclosure. The FIG. 15 aspect is similar to the FIG. 14 aspect, and, therefore, like reference numerals are provided in FIG. 15. One difference between the FIG. 15 aspect and the FIG. 14 aspect is that the outer deflector connecting member 214 is connected to the outer liner 54 via the outer liner connector 212 (e.g., by being bolted to the outer liner 54) rather than being bonded to either of the outer liner shell 208 or to the outer liner heat shield panel 210. Similarly, the inner deflector connecting member 232 is connected with the inner liner 52 via the inner liner connector 228 rather than being bonded to either the inner liner shell 224 or to the inner liner heat shield panel 226.

Figure 16:
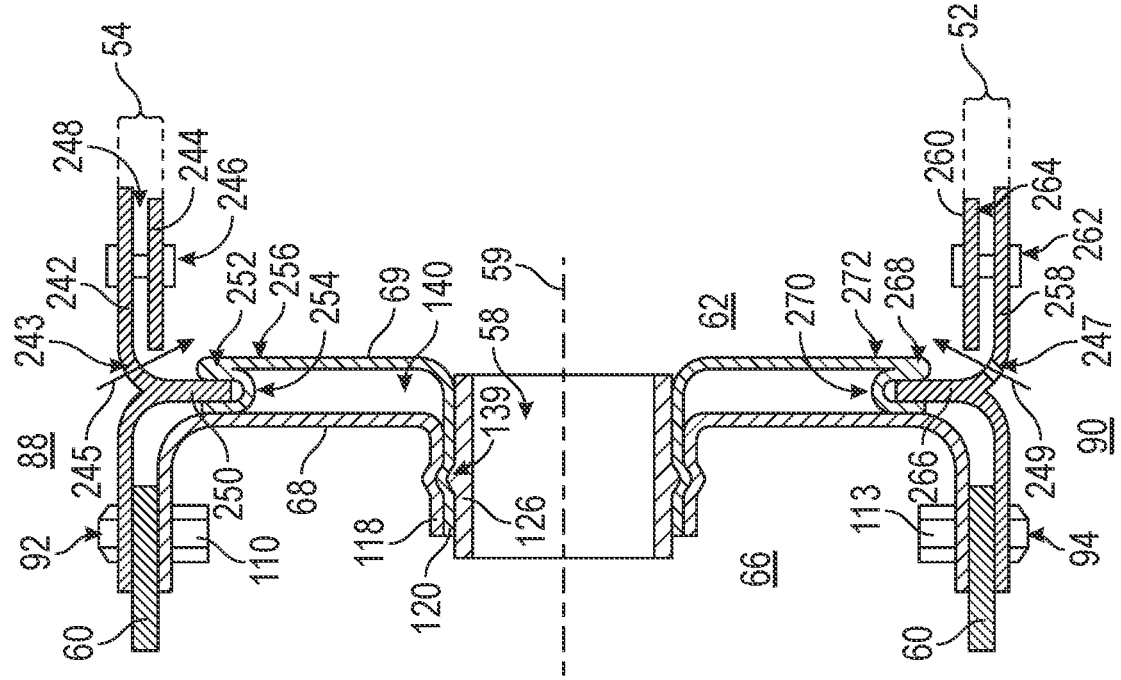
FIG. 16 is a partial cross-sectional side view of an yet another alternate exemplary dome-deflector structure to that shown in FIG. 4, according to yet another aspect of the present disclosure.

FIG. 16 is a partial cross-sectional side view of still yet another alternate exemplary dome-deflector structure to that shown in FIG. 4, according to still yet another aspect of the present disclosure. The FIG. 16 aspect is similar to the FIG. 14 and FIG. 15 aspects in that the FIG. 16 aspect includes the multi-layer outer liner 54 and the multi-layer inner liner 52. Thus, the outer liner 54 of the FIG. 16 aspect includes an outer liner shell 242 and an outer liner heat shield panel 244 that are connected via an outer liner connector 246, with a baffle cavity 248 therebetween. In the FIG. 16 aspect, however, the outer liner 54, and in particular, the outer liner shell 242 includes an outer liner deflector connecting member 250, which may be formed as part of the outer liner shell 242. The deflector 69 includes an outer connecting member 252 that may include a hook-type connector 254. The outer connecting member 252 engages with the outer liner deflector connecting member 250 via a snap-fit type connection 256. In addition, the outer liner shell 242 may include cooling passages 243 to allow a cooling airflow 245 to pass therethrough. Similarly, the inner liner shell 258 may include cooling passages 247 to allow a cooling airflow 249 to pass therethrough.

Similarly, the multi-layer inner liner 52 includes an inner liner shell 258 and an inner liner heat shield panel 260 that are connected via an inner liner connector 262, with a baffle cavity 264 therebetween. The inner liner 52, and, in particular, the inner liner shell 258 includes an inner liner deflector connecting member 266, which may be formed as part of the inner liner shell 258. The deflector 69 includes an inner connecting member 268 that may include a hook-type connector 270. The inner connecting member 268 engages with the inner liner deflector connecting member 266 via a snap-fit type connection 272.

Figure 17:
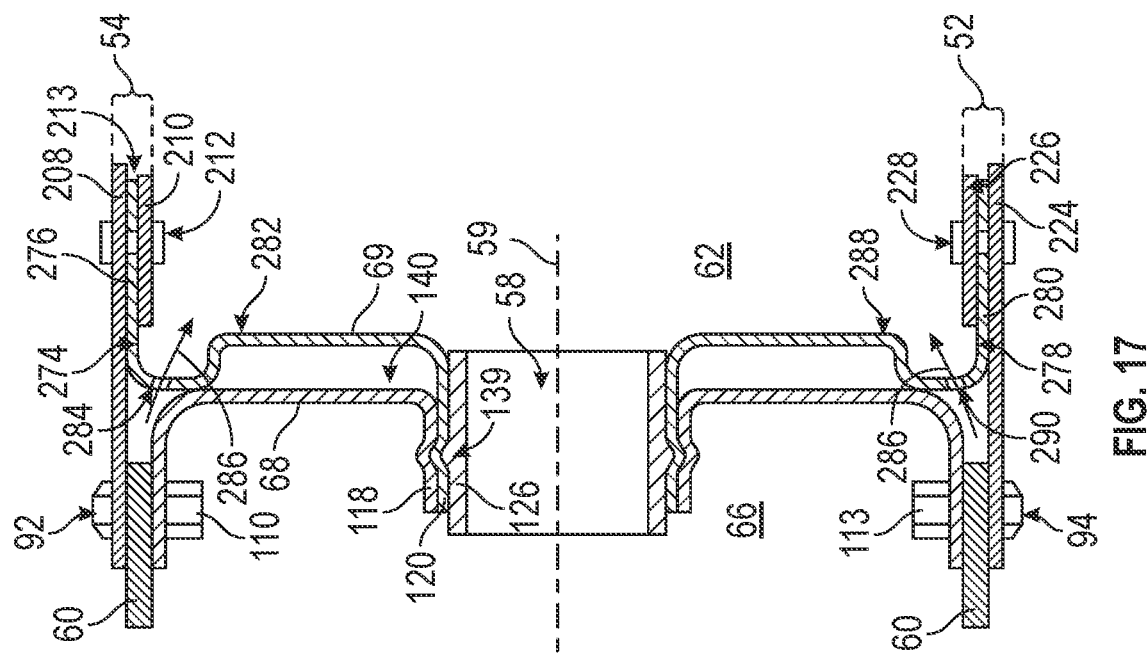
FIG. 17 is a partial cross-sectional side view of still yet another alternate exemplary dome-deflector structure to that shown in FIG. 4, according to still yet another aspect of the present disclosure.

FIG. 17 is a partial cross-sectional side view of yet another alternate exemplary dome-deflector structure to that shown in FIG. 4, according to yet another aspect of the present disclosure. The FIG. 17 aspect includes the multi-layer outer liner configuration for the outer liner 54, and, therefore, the outer liner 54 includes the outer liner shell 208 and the outer liner heat shield panel 210 that are connected via the outer liner connector 212. At the swirler assembly 58, the dome structure 68 and the deflector 69 are connected via the snap-fit type connection in the same manner as each of the foregoing aspects. The deflector 69 is similar to that of the FIG. 4 aspect in that the deflector 69 includes a flexure portion 282 that is similar to the flexure portion 152 (FIG. 4). The deflector 69 of the FIG. 17 aspect also includes an outer connecting member 274 that is an outer flange 276. In the FIG. 17 aspect, the outer flange 276 may be connected to the outer liner 54 at the outer liner connector 212 rather than being connected with the cowl 60 and the dome structure 68 at the outer connection 92. Alternatively, the outer flange 276 may be bonded (e.g., brazed) to either the outer liner shell 208 or to the outer liner heat shield panel 210 rather than being connected to the outer liner connector 212. The deflector 69 may also include cooling passages 284 to allow a flow of cooling air 286 to flow therethrough.

The FIG. 17 aspect further includes the multi-layer liner as the inner liner 52, and, therefore, includes the inner liner shell 224 and the inner liner heat shield panel 226 that are connected via the inner liner connector 228. The deflector 69 includes a flexure portion 288 that is similar to the flexure portion 156 (FIG. 4). The deflector 69 of the FIG. 17 aspect also includes an inner connecting member 278 that is an inner flange 280. In the FIG. 17 aspect, the inner flange 280 may be connected to the inner liner 52 at the inner liner connector 228 rather than being connected with the cowl 60 and the dome structure 68 at the inner connection 94. Alternatively, the inner flange 280 may be bonded (e.g., brazed) to either the inner liner shell 224 or to the inner liner heat shield panel 226 rather than being connected to the inner liner connector 228. The deflector 69 may also include cooling passages 290 to allow a flow of the cooling air 286 to flow therethrough.

While the foregoing description relates generally to a gas turbine engine, the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A combustor for a gas turbine, the combustor including a dome structure including a dome-side swirler opening therethrough, and a deflector connected to the dome structure, the deflector including a deflector-side swirler opening therethrough and a deflector-dome connecting member arranged at the deflector-side swirler opening, the deflector-dome connecting member being connected with the dome-side swirler opening via a snap-fit type connection.

The combustor according to the preceding clause, further comprising a swirler assembly extending through the dome-side swirler opening and extending through the deflector-side swirler opening, wherein the deflector-dome connecting member is arranged between the dome-side swirler opening and the swirler assembly and a seal is provided between the deflector and the swirler assembly.

The combustor according to any preceding clause, wherein the deflector includes one of a radially extending split dividing the deflector into circumferentially arranged sections, and a circumferentially extending split dividing the deflector into radially arranged sections.

The combustor according to any preceding clause, wherein a cavity is defined between the dome structure and the deflector, a perimeter of the cavity being sealed by a spline-joint connection between the deflector and the dome structure, the dome structure including a plurality of dome-side cooling passages providing a flow of cooling air to the cavity, and the deflector including a plurality of deflector-side cooling passages providing a flow of cooling air from the cavity to a combustion chamber side of the deflector.

The combustor according to any preceding clause, further including a cowl, an outer liner connected with the cowl via an outer connection, and an inner liner connected with the cowl via an inner connection, wherein the dome structure is connected with the cowl and the outer liner via the outer connection and is connected with the cowl and the inner liner via the inner connection, and the deflector further includes an outer connecting member connecting an outer side of the deflector with one of the dome structure, the outer connection, and the outer liner, and an inner connecting member connecting an inner side of the deflector with one of the dome structure, the inner connection, and the inner liner.

The combustor according to any preceding clause, wherein the outer connecting member comprises an outer flange connected with the outer connection, and the inner connecting member comprises an inner flange connected with the inner connection.

The combustor according to any preceding clause, wherein the outer flange includes multiple flange portions with a cutout portion extending between respective ones of the multiple flange portions.

The combustor according to any preceding clause, wherein respective ones of the multiple flange portions are connected with respective ones of the outer connections.

The combustor according to any preceding clause, wherein the outer flange includes a slotted airflow opening.

The combustor according to any preceding clause, wherein the outer flange includes a slotted cutout portion.

The combustor according to any preceding clause, wherein the outer flange includes a slotted airflow opening.

The combustor according to any preceding clause, wherein the inner flange includes multiple flange portions with a cutout portion extending between respective ones of the multiple flange portions.

The combustor according to any preceding clause, wherein respective ones of the multiple flange portions are connected with respective ones of the outer connections.

The combustor according to any preceding clause, wherein the inner flange includes a slotted cutout portion.

The combustor according to any preceding clause, wherein the inner flange includes a slotted airflow opening.

The combustor according to any preceding clause, wherein the outer connecting member comprises an outer flange connected with the dome structure via a snap-fit type connection, and the inner connecting member comprises an inner flange connected with the dome structure via a snap-fit type connection. The combustor according to any preceding clause, further comprising an outer deflector connecting member connected with the outer connection, and an inner deflector connecting member connected with the inner connection, the deflector further including an outer connecting member connected with the outer deflector connecting member via a hook-type connection, and an inner connecting member connected with the inner deflector connecting member via a hook-type connection.

The combustor according to any preceding clause, wherein the outer liner includes an outer liner deflector connecting member, the outer connecting member being connected with the outer liner deflector connecting member via a snap-fit type connection, and the inner liner includes an inner liner deflector connecting member, the inner connecting member being connected with the inner liner deflector connecting member via a snap-fit type connection.

The combustor according to any preceding clause, wherein the deflector includes a flexure portion arranged in at least one of a radially outer side of the deflector and a radially inner side of the deflector.

The combustor according to any preceding clause, wherein the flexure portion includes an airflow opening therethrough.

The combustor according to any preceding clause, wherein the outer connecting member comprises an outer flange, the outer flange being connected with the outer liner, and the inner connecting member comprises an inner flange, the inner flange being connected with the inner liner.

The combustor according to any preceding clause, wherein the outer flange is connected with the outer liner via an outer liner connector, and the inner flange is connected with the inner liner via an inner liner connector.

The combustor according to any preceding clause, wherein the outer liner includes an outer deflector connecting member, and the outer connecting member is connected with the outer deflector connecting member via a hook-type connection, and the inner liner includes an inner deflector connecting member, and the inner deflector connecting member is connected with the inner connecting member via a hook-type connection.

The combustor according to any preceding clause, wherein the outer liner includes an outer deflector connecting member, and the outer connecting member is connected with the outer deflector connecting member via a snap-fit type connection, and the inner liner includes an inner deflector connecting member, and the inner deflector connecting member is connected with the inner connecting member via a snap-fit type connection.

The combustor according to any preceding clause, wherein the outer deflector connecting member is connected with the outer liner via an outer liner connector, and the inner deflector connecting member is connected with the inner liner via an inner liner connector.

The combustor according to any preceding clause, wherein the outer deflector connecting member is bonded to the outer liner, and the inner deflector connecting member is bonded to the inner liner.

A dome-deflector structure including a dome structure having a dome-side swirler opening therethrough, and a deflector connected to the dome structure, the deflector including a deflector-side swirler opening therethrough and a deflector-dome connecting member arranged at the deflector-side swirler opening, the deflector-dome connecting member being connected with the dome-side swirler opening via a snap-fit type connection.

The dome-deflector structure according to the preceding clause, wherein the deflector includes an outer flange connected with the dome structure via a snap-fit type connection, and an inner flange connected with the dome structure via a snap-fit type connection.

The dome-deflector structure according to any preceding clause, wherein the deflector includes a flexure portion arranged in at least one of a radially outer side of the deflector and a radially inner side of the deflector.

The dome-deflector structure according to any preceding clause, wherein the flexure portion includes a plurality of cooling passages therethrough.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. A combustor for a gas turbine, the combustor comprising:
    a dome structure including a dome wall having a dome-side swirler opening therethrough and a deflector connecting flange extending circumferentially about the dome-side swirler opening and extending upstream in a longitudinal direction from the dome wall, the deflector connecting flange including a V-shaped dome notch with an apex of the V-shaped dome notch extending radially outward in a radial direction from an inner surface of the deflector connecting flange; and
    a deflector connected to the dome structure, the deflector including a deflector wall having a deflector-side swirler opening therethrough, and a deflector-dome connecting member arranged at the deflector-side swirler opening, the deflector-dome connecting member extending circumferentially about the deflector-side swirler opening and extending upstream in the longitudinal direction from the deflector wall, the deflector-dome connecting member including a V-shaped deflector notch with an apex of the V-shaped deflector notch extending radially outward in the radial direction from an inner surface of the deflector-dome connecting member, and a V-shaped deflector crest with an apex of the V-shaped deflector crest extending radially outward in the radial direction from an outer surface of the deflector-dome connecting member, wherein the deflector connecting flange is installed onto the deflector-dome connecting member with the V-shaped deflector crest engaging with the V-shaped dome notch to connect the dome structure to the deflector via a first snap-fit connection that retains the deflector connecting flange connected to the deflector-dome connecting member, and wherein the deflector includes a flexure portion arranged in at least one of a radially outer side of the deflector or a radially inner side of the deflector such that the flexure portion abuts the dome structure to form a cavity between the dome structure and the deflector.

2. The combustor according to claim 1, further comprising a swirler assembly extending through the deflector-side swirler opening, the swirler assembly including a swirler outlet housing having a V-shaped crest with an apex of the V-shaped crest extending radially outward in the radial direction from the swirler outlet housing, wherein the V-shaped crest of the swirler outlet housing engages with the V-shaped deflector notch of the deflector-dome connecting member to form a second snap-fit connection between the deflector-dome connecting member and the swirler outlet housing.

3. The combustor according to claim 1, wherein the deflector includes a radially extending split dividing the deflector into circumferentially arranged sections.

4. The combustor according to claim 1, wherein a perimeter of the cavity is sealed by a spline-joint connection between the deflector and the dome structure, the dome structure including a plurality of dome-side cooling passages providing a flow of cooling air to the cavity, and the deflector including a plurality of deflector-side cooling passages providing a flow of cooling air from the cavity to a combustion chamber side of the deflector.

5. The combustor according to claim 1, wherein the flexure portion includes an airflow opening therethrough.

6. The combustor according to claim 1, further comprising:
a cowl;
an outer liner connected with the cowl via an outer connection; and
an inner liner connected with the cowl via an inner connection,
wherein the dome structure is connected with the cowl and the outer liner via the outer connection and is connected with the cowl and the inner liner via the inner connection, and the deflector further includes an outer connecting member connecting an outer side of the deflector with one of the dome structure, the outer connection, and the outer liner, and an inner connecting member connecting an inner side of the deflector with one of the dome structure, the inner connection, and the inner liner.

7. The combustor according to claim 6, wherein the outer connecting member comprises an outer flange connected with the outer connection, and the inner connecting member comprises an inner flange connected with the inner connection.

8. The combustor according to claim 6, wherein the outer connecting member comprises an outer flange, the outer flange being connected with the outer liner, and the inner connecting member comprises an inner flange, the inner flange being connected with the inner liner.

9. A dome-deflector structure comprising:
a dome structure including a dome wall having a dome-side swirler opening therethrough and a deflector connecting flange extending circumferentially about the dome-side swirler opening and extending upstream in a longitudinal direction from the dome wall, the deflector connecting flange including a V-shaped dome notch with an apex of the V-shaped dome notch extending radially outward in a radial direction from an inner surface of the deflector connecting flange; and a deflector connected to the dome structure, the deflector including a deflector wall having a deflector-side swirler opening therethrough, and a deflector-dome connecting member arranged at the deflector-side swirler opening, the deflector-dome connecting member extending circumferentially about the deflector-side swirler opening and extending upstream in the longitudinal direction from the deflector wall, the deflector-dome connecting member including a V-shaped deflector notch with an apex of the V-shaped deflector notch extending radially outward in the radial direction from an inner surface of the deflector-dome connecting member, and a V-shaped deflector crest with an apex of the V-shaped deflector crest extending radially outward in the radial direction from an outer surface of the deflector-dome connecting member, wherein the deflector connecting flange is installed onto the deflector-dome connecting member with the V-shaped deflector crest engaging with the V-shaped dome notch to connect the dome structure to the deflector via a snap-fit connection that retains the deflector connecting flange connected to the deflector-dome connecting member, and wherein the deflector includes a flexure portion arranged in at least one of a radially outer side of the deflector or a radially inner side of the deflector such that the flexure portion abuts the dome structure to form a cavity between the dome structure and the deflector.

10. The dome-deflector structure according to claim 9, wherein the flexure portion includes a plurality of cooling passages therethrough.

11. The dome-deflector structure according to claim 9, wherein the deflector includes a radially extending split dividing the deflector into circumferentially arranged sections.

12. The dome-deflector structure according to claim 9, wherein a perimeter of the cavity is sealed by a spline-joint connection between the deflector and the dome structure, the dome structure including a plurality of dome-side cooling passages for providing a flow of cooling air to the cavity, and the deflector including a plurality of deflector-side cooling passages for providing a flow of cooling air from the cavity to a combustion chamber side of the deflector.

* * * * *